Figure 1:
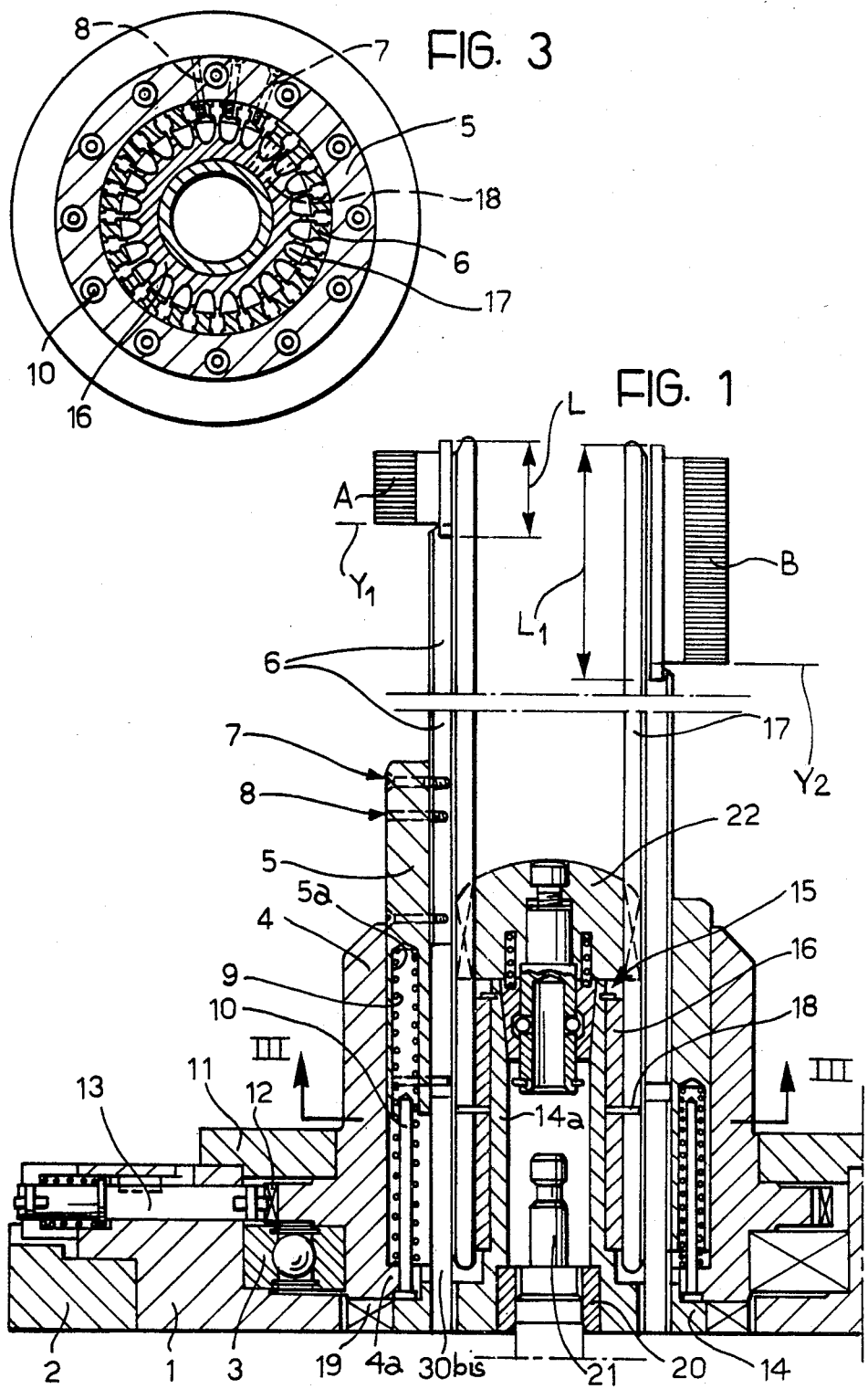

United States Patent [19]

Barrera

[11] Patent Number: 4,521,958

[45] Date of Patent: Jun. 11, 1985

[54] PRE-WOUND COILS INSERTING DEVICE FOR USE IN THE MANUFACTURE OF DYNAMO-ELECTRIC MACHINES

[75] Inventor: Giorgio Barrera, Leumann, Italy

[73] Assignee: Officine Meccaniche Pavesi & C. S.p.A., Turin, Italy

[21] Appl. No.: 546,358

[22] Filed: Oct. 28, 1983

[30] Foreign Application Priority Data

Oct. 28, 1982 [IT] Italy ................. 68261 A/82

[51] Int. Cl.$^3$ ............................................. H02K 15/06
[52] U.S. Cl. ........................................ 29/734; 29/596; 29/736
[58] Field of Search ............. 29/734, 736, 732, 596, 29/606

[56] References Cited

U.S. PATENT DOCUMENTS 4,480,379 11/1984 Witwer ............................ 29/734 X Primary Examiner—Carl E. Hall
Attorney, Agent, or Firm—Sughrue, Mion, Zinn, Macpeak & Seas

[57] ABSTRACT

A device of the known type comprising an annular series of coil-guide blades intended to receive pre-wound coils to be inserted into stator slots, an annular series of wedge-guide blades surrounding the series of coil-guide blades and terminating a short distance before the free ends of the coil-guide blades in such a way as to allow the stator to rest on the free ends of the wedge-guide blades by disposing it about the coil-guide blades and a thrust member which is slidable through the series of coil-guide blades for inserting the coils into the stator slots. The wedge-guide blades are axially displaceable in the direction opposite their free ends, against the action of resilient means. Due to this characteristic, when the stator is pressed on the free ends of the wedge-guide blades and fixed in position for the insertion of the coils, the said free ends of the wedge-guide blades are automatically disposed at a distance from the free ends of the coil guide blades corresponding to the length of the stator.

10 Claims, 3 Drawing Figures

PRE-WOUND COILS INSERTING DEVICE FOR USE IN THE MANUFACTURE OF DYNAMO-ELECTRIC MACHINES

The present invention relates to a device for inserting pre-wound coils into the stator slots of dynamo-electric machines, the device being of the type comprising:
- an annular series of coil-guide blades intended to receive the pre-wound coils to be inserted into the stator slots;
- an annular series of wedge-guide blades surrounding the coil-guide blades and terminating a short distance before the free ends of the coil-guide blades in such a way as to allow the stator to rest on the free ends of the wedge-guide blades by positioning it around the coil-guide blades, and
- a thrust member, slidable through the series of coil-guide blades, for inserting the coils into the stator slots.

A device of the type specified above is, for example, described and illustrated in U.S. Pat. No. 3,324,536 (Hill).

In devices of this type the distance between the free ends of the coil-guide blades and the free ends of the wedge-guide blades corresponds substantially to the length (axial dimension) of the stator on which the device is designed to operate.

It follows that when the length of the stator is varied, the said relative position between the free end of the coil-guide blades and the wedge-guide blades must be varied. The term "wedges" is used in the art to indicate inserts, usually U-shape, of insulating material, with which the stator slots are closed to protect the pre-wound coils inserted into the stator. In one standard technique (see for example the U.S. Patent cited above) the wedges are inserted into the stator slots during the coil insertion operation by means of a series of wedge-thrusting rods which urge the wedges themselves in the direction of the stator through the spaces between one wedge-guide and the next. Naturally, since at the end of the insertion phase the upper ends of the wedge-thrusting rods must be located in correspondence with the lower surface of the stator (to allow the correct insertion of the wedges into the stator slots) and since the stroke of the wedge-thrusting rods is always the same, it follows that when the length of the stator is varied it is necessary also to vary not only the length of the wedge but also the starting position of the wedge-thrusting rods before the inserting stroke.

In conclusion, whenever the length of the stator is varied it is necessary to vary each of the following three parameters:
(a) the length of the wedges,
(b) the relative position of the wedge-guide blades and the coil-guide blades,
(c) the position of the wedge-thrusting rods at the commencement of the insertion stroke.

To meet the requirements of rapidly adapting the device to different stator lengths (the length of the stator is varied quite frequently in normal production) there have already been proposed various devices which provide for variation of the said three parameters (a), (b), (c) according to the pre-selected length of the stator. All the previously proposed devices, however, are relatively complicated.

The object of the present invention is to provide a device of the above specified type which allows automatic adaptation to different stator length in a simple and rapid manner.

The main characteristic of the device according to the invention lies in the fact that the wedge-guide blades are axially displaceable in a direction away from their free ends, against the action of resilient means.

Thanks to this characteristic, when the stator is pressed on the free ends of the wedge-guide blades and held in position for insertion of the coils, the said free ends of the wedge-guide blades are disposed at a distance from the ends of the coil-guide blades corresponding to the length of the stator.

In the device according to the invention, therefore, as opposed to the previously proposed devices (in which the variation of each of the said parameters including the parameter b), was obtained by means of a corresponding operation of a manual or automatic control device), the variation in the relative position of the wedge-guide blades and the coil-guide blades (parameter (b)) does not require any control operation but is automatically effected by the same action as that which place the stator over the upper free ends of the wedge-guide blades.

Figure 2:
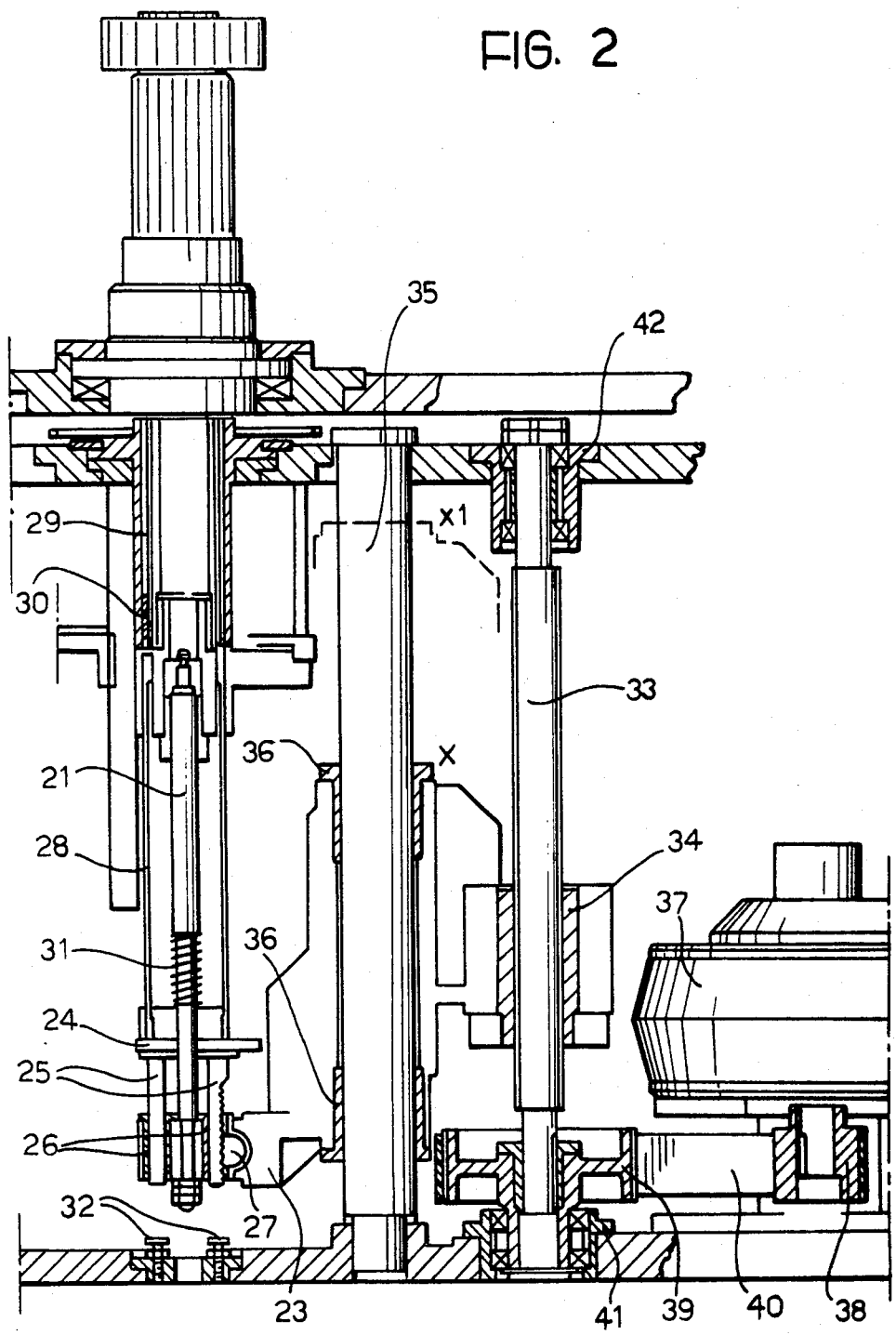

Further characteristics and advantages of the present invention will become apparent from the following description with reference to the attached drawings, provided purely by way of non-limitative example, in which:

FIG. 1 is a sectional view of the upper part of an insertion device according to the invention, the left half and the right half of this Figure illustrating two different operating conditions, FIG. 2 is a schematic view of the device according to the invention, and FIG. 3 is a sectional view on the line III—III of FIG. 1.

In the present description the device according to the invention is illustrated with its coil-guide blades and the wedge-guide blades disposed vertically with their free ends facing upwards. Therefore, both in the description itself and in the claims which follow, the terms "upper" and "lower" are used with reference to this working position even though, of course, the device according to the invention could also be used in a different orientation.

In FIG. 1 reference numeral 1 indicates an annular element for supporting a rolling-element bearing 3, this element being fixed to a plate 2 which can be a fixed plate (if the device is constituted by a single insertion tool) or form part of a rotatable table (if the device forms part of a multiple-tool insertion machine).

The rolling-element bearing 3 supports a guide bush 4 for rotation about its axis.

A bush 5, within which is fixed a series of wedge-guide blades 6, is axially slidably mounted within the guide bush 4. The wedge-guide blades 6 are fixed to the slidable bush 5 by screws 7 and a reference pin 8.

In the slidable bush 5, starting from the lower end surface, there is formed a series of blind axial holes 5a in which are received a corresponding number of helical springs 9. Each spring 9 is interposed between the blind end of the associated hole 5a and an inner annular flange 4a with which the bush 4 is provided at its lower end. The lower ends of guide pins 10 are fixed to the flange 4a, each pin being inserted within a respective spring 9 and a respective hole 5a. The bush 4 is maintained in a fixed axial position by a ring 11 and is formed with an outer annular flange provided on its periphery with a reference notch 12 intended to cooperate with a reference member 13 resiliently urged against it in such a way as to allow the correct angular positioning of the bush 4.

At the lower end of the bush 4 there is fixed an outer annular flange 14 of an inner bush 14a. A cylindrical blade carrier 17a is keyed and axially fixed to the inner bush 14a by means of a resilient ring 15. The cylindrical blade carrier 17a has on its outer surface, in a manner known per se, a series of longitudinal grooves in which the coil-guide blades 17 are received and retained by means of pins 18. The annular series of coil-guide blades 17 is surrounded by the annular series of wedge-guide blades 6. Each wedge-guide blade 6 is disposed adjacent the outer face of an associated coil-guide blade. The said outer face of each coil-guide blade has, in a known way, longitudinal grooves in which the respective wedge-guide blade is slidably mounted. This latter has, also in a known way, two sides each having a groove for guiding an associated wedge.

The annular flange 14 of the bush 14a is provided in a known manner on its periphery with two or more coupling slots 19 for coupling an indexing head operable to control the rotation of the unit supported rotatably by the bearing 3. This has the purpose of allowing the correct positioning of the various coils in the stator slots. The flange 14 further has an annular series of axial through slots for guiding the wedges.

The bush 14a is further provided internally and adjacent its lower end with a bush 20 for guiding a rod 21 intended to control the vertical movement of a thrust member 22, of a type known per se, which is slidably mounted within the annular series of coil-guide blades 17 and which is intended to effect the insertion of the coils into the stator. The rod 21 has an upper end which is connectable to the thrust member by means of a ball catch which is not described below since it is of known type and does not fall within the scope of the present invention.

With reference to FIG. 2, the insertion rod 21 is fixed at its lower end to an insertion carriage 23. Also connected to this insertion carriage 23 is a support 24 to which is fixed a series of wedge-thrusting rods 28 intended to effect insertion of the wedges into the stator slots.

The support 24 has two lower pins 25 slidably mounted within two bushes 26 carried by the insertion carriage 23. One of the pins 25 is locked in a fixed axial position relative to the insertion carriage 23 by means of a grooved wedge 27 controlled by a fluid cylinder (not illustrated).

A helical spring 31 is interposed between an annular shoulder of the rod 21 and the support 24 and serves to urge the support 24 downwardly causing the pins 25 to slide within the bushes 26 as soon as the wedge 27 is released. Following this release, the lower ends of the pins 25 come into contact with the two stop members 32.

The vertical displacement of the insertion carriage 23 is controlled by a recirculating ball screw 33 engaged within a lead nut 34 forming part of the insertion carriage 23. This latter also includes a central structure slidably mounted with the interposition of bushes 36 on a guide column 35. The rotation of the screw 33 is controlled by a dc motor 37 via a toothed belt transmission including a pair of pulleys 38, 39 and a toothed belt 40. The screw 33 is supported at its ends by bearing supports 41, 42 which ensure its rigidity.

The wedge store (indicated with the reference numeral 29) is also illustrated in FIG. 2. This store is of a type known per se and has on its periphery a series of longitudinal grooves in which the wedges 30 intended to be inserted into the stator slots are received.

The operation of the device described above is as follows:

When the relative position between the coil-guide blades and the wedge-guide blades is as illustrated in the left half of FIG. 1, the device is ready to operate on stators of minimum length. The stator (indicated A) is disposed around the coil-guide blades 17 and rests on the free ends of the wedge-guide blades 6. At this point the motor 36 drives the screw 33 in such a way as to cause the insertion carriage 23 to rise. The surface of the carriage 23 which is indicated X in FIG. 2 is thus carried to the level $X_1$. The carriage 23 axially moves the insertion rod 21 which effects insertion of the pre-wound coils into the stator slots. These pre-wound coils, as usual, are disposed on the coil-guide blades before insertion into the stator in such a way that when the thrust member 22 rises within the coil-blade guides, it causes the coils to slide with respect to the coil-guide blades until they are inserted into the interior of the stator slots. At the same time, the insertion carriage 23 acting via the support 24 and the pins 25, causes the wedge-thrusting rods 28 to rise. The wedge-thrusting rods 28 press the wedges 30 through the magazine 29 and through the spaces lying between the wedge-guide blades in such a way that when the carriage 23 has reached the said point $X_1$ the upper part of the wedge-thrusting rods 28 has reached the point indicated $Y_1$ in the left part of FIG. 1. The wedges 30 (of length L) are thus introduced into the slots of the stator A.

When it is desired to work on a stator B (see the right hand part of FIG. 1) having the maximum length provided for (length of the wedges equal to $L_1$), it is necessary to release the wedge 27 so that the lower ends of the pins 25 move into contact with the stop members 32. Relocking the wedge 27 will leave the support 24 displaced downwardly with respect to its initial position by the whole of the difference between the level $Y_1$ indicated in the left part of FIG. 1 and the level $Y_2$ (corresponding to the lower end surface of the stator of maximum length) indicated in the right hand part of FIG. 1. This condition is achieved by correspondingly adjusting the position of the stop numbers 32. When the displacement of the insertion carriage from the level X to the level $X_1$ is effected, the upper ends of the wedge-thrusting rods will only reach to the level $Y_2$. The upper ends of the wedge-guide rods 6 will also be located at this level since when the stator B is disposed about the coil-guide blades 17 and pressed on the upper end of the wedge-guide blades 6 these latter move downwardly against the action of the springs 9. Naturally, during the insertion operation, the stator is locked in position by means of known type (not illustrated). Obviously, to render the device able to operate on stators of maximum length after having operated on stators of minimum length, it is necessary to provide the wedge magazine with a series of wedges having a length of $L_1$. This can be achieved in a known way by means of an automatic electronic digitally-controlled system. To operate on a stator having a length intermediate between the minimum length L and a maximum length $L_1$ it is necessary to proceed as follows:

(a) release the wedge 27 so as to allow the lowering of the pins 25 against the stop members 32;

(b) activate the motor 37 so as to lower the insertion carriage 23 by an amount corresponding to the difference between the maximum length and the length of the required stator;

(c) lock the pins 25 in position with respect to the insertion carriage 23 by means of the wedges 27;

(d) activate the motor 37 in such a way as to bring the insertion carriage 23 back to the starting position X;

(e) supply the wedge magazine by means of the usual automatic system, a series of wedges having a length corresponding to that of the stator on which it is intended to operate.

As can be seen, no control operations are required in respect of positioning the free ends of the wedge-guide blades 6 at a distance from the free ends of the coil-guide blades 17 equal to the length of the stator on which the machine is to operate. Such positioning is, in fact, obtained as a direct consequence of placing the stator over the wedge-guide blades 6 due to the resilient downward movement of these blades.

I claim:

1. A device for inserting pre-wound coils into stator slots of dynamo-electric machines, comprising:

an annular series of coil-guide blades having free ends intended to receive the pre-wound coils to be inserted into the stator slots, an annular series of wedge-guide blades surrounding the coil-guide blades and having free ends terminating a short distance before the free ends of the coil-guide blades in such a way as to allow the stator to rest on the free ends of the wedge-guide blades by positioning it around the coil-guide blades, a thrust member slidable through the series of coil-guide blades for inserting the coils into the stator slots, said wedge-guide blades being axially displaceable in a direction away from their free ends, and resilient means urging said wedge-guide blades in the direction of the free ends thereof.

2. A device according to claim 1, wherein the wedge-guide blades are fixed within a bush which is axially displaceable downwards against the action of the said resilient means.

3. A device according to claim 2, wherein the said resilient means are constituted by a series of helical springs received in blind axial holes which are formed in the said bush and extend from the lower end face of the bush.

4. A device according to claim 3, wherein the said bush is axially slidably mounted within a guide bush, wherein this guide bush is provided at its lower end with an inner annular flange, and wherein the said helical springs are each interposed between the blind end of their respective holes and the said inner annular flange.

5. A device according to claim 4, wherein the lower ends of axial guide pins are fixed to the said inner annular flange of the guide bush, each pin extending within a respective helical spring and within a respective axial hole of the guide bush.

6. A device according to claim 1, wherein each coil-guide blade has an outer face formed with a longitudinal groove, wherein each wedge-guide blade has two sides each with a longitudinal groove for guiding a wedge, and wherein each wedge-guide blade is slidably mounted in the longitudinal groove of the outer face of a respective coil-guide blade.

7. A device according to claim 4, wherein the said guide bush is mounted rotatably about its axis on a support structure and wherein the coil-guide blades are fixed to a hollow cylindrical blade carrier which is rigidly connected to an outer annular flange having an annular series of axial through slots for guiding the wedges and at least two peripheral slots for coupling to an indexing head.

8. A device according to claim 7, wherein the hollow cylindrical blade carrier is rigidly connected to the said guide bush.

9. A device according to claim 1, including a series of wedge-thrusting rods and an insertion carriage reciprocably displaceable in a vertical direction to drive the wedge-thrusting rods, wherein the wedge-thrusting rods are fixed to a support adjustable in vertical position with respect to the insertion carriage.

10. A device according to claim 9, wherein such device is provided with wedge-type locking means cooperating with a pin rigidly connected to the support of the wedge-thrusting rods for locking the said support with respect to the insertion carriage.

* * * * *